United States Patent
Turner et al.

(10) Patent No.: US 6,784,574 B2
(45) Date of Patent: Aug. 31, 2004

(54) AIR FLOW ARRANGEMENT FOR A STAND-BY ELECTRIC GENERATOR

(75) Inventors: Chris Turner, Whitewater, WI (US); Christine Richardson, Delavan, WI (US); Robert D. Kern, Waukesha, WI (US); Gerald C. Ruehlow, Oconomowoc, WI (US)

(73) Assignee: Generac Power Systems, Inc., Waukesha, WI (US)

(*) Notice: Subject to any disclaimer, the term of this patent is extended or adjusted under 35 U.S.C. 154(b) by 0 days.

(21) Appl. No.: 09/797,231

(22) Filed: Mar. 1, 2001

(65) Prior Publication Data

US 2002/0121818 A1 Sep. 5, 2002

(51) Int. Cl.[7] .................................................. H02K 9/00
(52) U.S. Cl. .......................... 310/58; 310/59; 290/1 B
(58) Field of Search ........................ 310/47, 50, 52–59, 310/60 R, 61–65, 60 A; 123/2, 3; 290/1 B, 1 A

(56) References Cited

U.S. PATENT DOCUMENTS

| | | | |
|---|---|---|---|
| 4,122,353 A | 10/1978 | Noguchi | 290/1 |
| 4,608,946 A | 9/1986 | Tanaka et al. | 123/2 |
| 4,647,835 A * | 3/1987 | Fujikawa et al. | 290/1 B |
| 4,677,944 A | 7/1987 | Nishimura et al. | 123/73 |
| 4,702,201 A | 10/1987 | Odo et al. | 123/2 |
| 5,624,589 A * | 4/1997 | Latvis et al. | 219/133 |
| 5,642,702 A * | 7/1997 | Kouchi et al. | 123/198 E |
| 5,731,687 A * | 3/1998 | Hirano et al. | 123/198 E |
| 5,899,174 A * | 5/1999 | Anderson et al. | 123/2 |
| 5,977,667 A | 11/1999 | Hirose | 310/51 |
| 6,376,944 B1 | 4/2002 | Grizzle, Jr. et al. | 310/52 |

* cited by examiner

*Primary Examiner*—Dang Le
(74) *Attorney, Agent, or Firm*—Boyle Fredrickson Newholm Stein & Gratz S.C.

(57) ABSTRACT

An air flow structure is provided for controlling the flow of air through an enclosure of a generator. The enclosure has first and second opposite ends and the generator includes an alternator and an engine driving the alternator. A first air flow generator draws ambient air into the chamber through the first end of the enclosure and directs the first portion of air in the chamber across the engine. A second air flow generator draws a second portion of the air over the alternator, and thereafter, combines the first portion of air directed over the engine and the second portion of air drawn over the alternator. The second air flow generator urges the combined air from the enclosure through the second end thereof.

12 Claims, 1 Drawing Sheet

AIR FLOW ARRANGEMENT FOR A STAND-BY ELECTRIC GENERATOR

FIELD OF THE INVENTION

This invention relates generally to generators, and in particular, to an air flow arrangement for facilitating the cooling of the components of a stand-by electric generator.

BACKGROUND AND SUMMARY OF THE INVENTION

As is known, stand-by electrical generators are used in a wide variety of applications. The stand-by electric generator utilizes a driving engine directly coupled to a generator or alternator through a common shaft. Upon actuation of the engine, the crankshaft thereof rotates the common shaft so as to drive the alternator, which in turn, generates electricity. The engine and the alternator are housed in an enclosure having louvers in the walls thereof A fan is coupled to the crankshaft of the engine so as to rotate during operation of the engine. The rotating fan draws air into the enclosure through the louvers in the walls thereof and blows air over the components of the stand-by electrical generator, including the engine, the alternator, and the radiator for the engine. In such manner, it is intended that the air passing over the components of the stand-by electrical generator have a cooling effect on such components during their operation in order to maintain the temperature of the components below the breakdown temperatures thereof.

While functional for its intended purpose, the air flow arrangement of prior stand-by electrical generators merely recirculates the air drawn into the enclosure and fails to provide an adequate arrangement for the air to be purged from the enclosure after a heat exchange is effectuated between the air and the components. As such, the cooling effect on the components of the stand-by electrical generator by the ambient air drawn into the enclosure is somewhat limited. In other words, the components of the stand-by electrical generator often operate at higher than desired temperatures. This, in turn, may reduce the overall efficiency of the stand-by electrical generator and may cause premature failure of the components thereof. Consequently, it is highly desirable to provide an air flow arrangement for a stand-by electrical generator which provides additional cooling for the components thereof during operation.

Therefore, it is a primary object and feature of the present invention to provide an air flow arrangement for a stand-by electrical generator which improves the operating efficiency of the same.

It is a further object and feature of the present invention to provide an air flow arrangement for a stand-by electrical generator which facilitates greater cooling of the components of the generator within an enclosure than that of prior art air flow arrangements.

It is a still further object and feature of the present invention to provide an air flow arrangement for a stand-by electrical generator which is simple and inexpensive to implement.

It is a still further object and feature of the present invention to provide an air flow arrangement for a stand-by electrical generator which reduces the noise associated with operation of the same.

In accordance with the present invention, a generator structure is provided. The generator structure includes an enclosure having first and second opposite ends. The enclosure defines a chamber for receiving an engine and an alternator therein. A first air flow generator is positioned within the chamber enclosure for drawing ambient air into the chamber through the first end of the enclosure and for directing a first portion of the air in the chamber across the engine. A second air flow generator is positioned within the chamber of the enclosure for drawing a second portion of air in the chamber over the alternator and for combining the first portion of air directed over the engine and the second portion of air drawn over the alternator.

The second air flow generator urges the combined air from the enclosure through the second end thereof. A muffler may be positioned within the chamber of the enclosure adjacent the second end to dampen the noise generated by the exhaust of the engine. The generator structure may also include an alternator housing within the chamber of the enclosure. The alternator housing has an interior for supporting the alternator therein. A base supports the enclosure of the supporting surface. The base is generally hollow and has an input communicating with the chamber and an output communicating with the interior of the alternator housing so as to define a flow path therethrough for the second portion of air.

In accordance with a still further aspect of the present invention, an air flow structure is provided for controlling the flow of air through a chamber in an enclosure for a generator. The enclosure has first and second opposite ends and the generator includes an alternator and an engine driving the alternator. The air flow structure includes a first air flow generator positioned within the chamber of the enclosure and for directing a first portion of the air in the chamber across the engine. A second air flow generator is positioned within a chamber of the enclosure and draws a second portion of the air in the chamber over the alternator. The second air flow generator combines the first portion of the air directed over the engine and the second portion of air drawing over the alternator and urges the combined air from the enclosure through the second end thereof.

A muffler may be positioned within the chamber of the enclosure adjacent the second end thereof. The muffler is operatively connected to the engine for quieting the exhaust thereof. An alternator housing is also positioned within the chamber of the enclosure. The alternator housing has an interior for supporting the alternator therein. A base supports the enclosure about a supporting surface. The base is generally hollow and has an input communicating with the chamber and an output communicating with the interior of the alternator housing so as to define a flow path therethrough for the second portion of air.

In accordance with a still further aspect of the present invention, a method is provided for controlling the flow of air through a chamber in an enclosure for a generator. The enclosure has first and second opposite ends and the generator includes an alternator and an engine driving the alternator. The method includes the step of drawing air into the chamber of the enclosure through the first end thereof and directing the first portion of the air drawn into the chamber over the engine. A second portion of the air drawn into the chamber is directed over the alternator. Thereafter, the first and second portions of the air are combined and provided as combined air. The combined air is exited from the chamber through the second end of the enclosure.

The method may include the additional steps of providing an alternator housing within the chamber of the enclosure. The alternator housing has an interior for supporting the alternator therein. In addition, the enclosure is supported above the supporting surface by a base. the base is generally hollow and has an input communicating with the chamber in the enclosure and has an output communicating with the interior of the alternator housing. It is contemplated to pass the first portion of air over a muffler prior to exiting the combined air from the second end of the enclosure.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
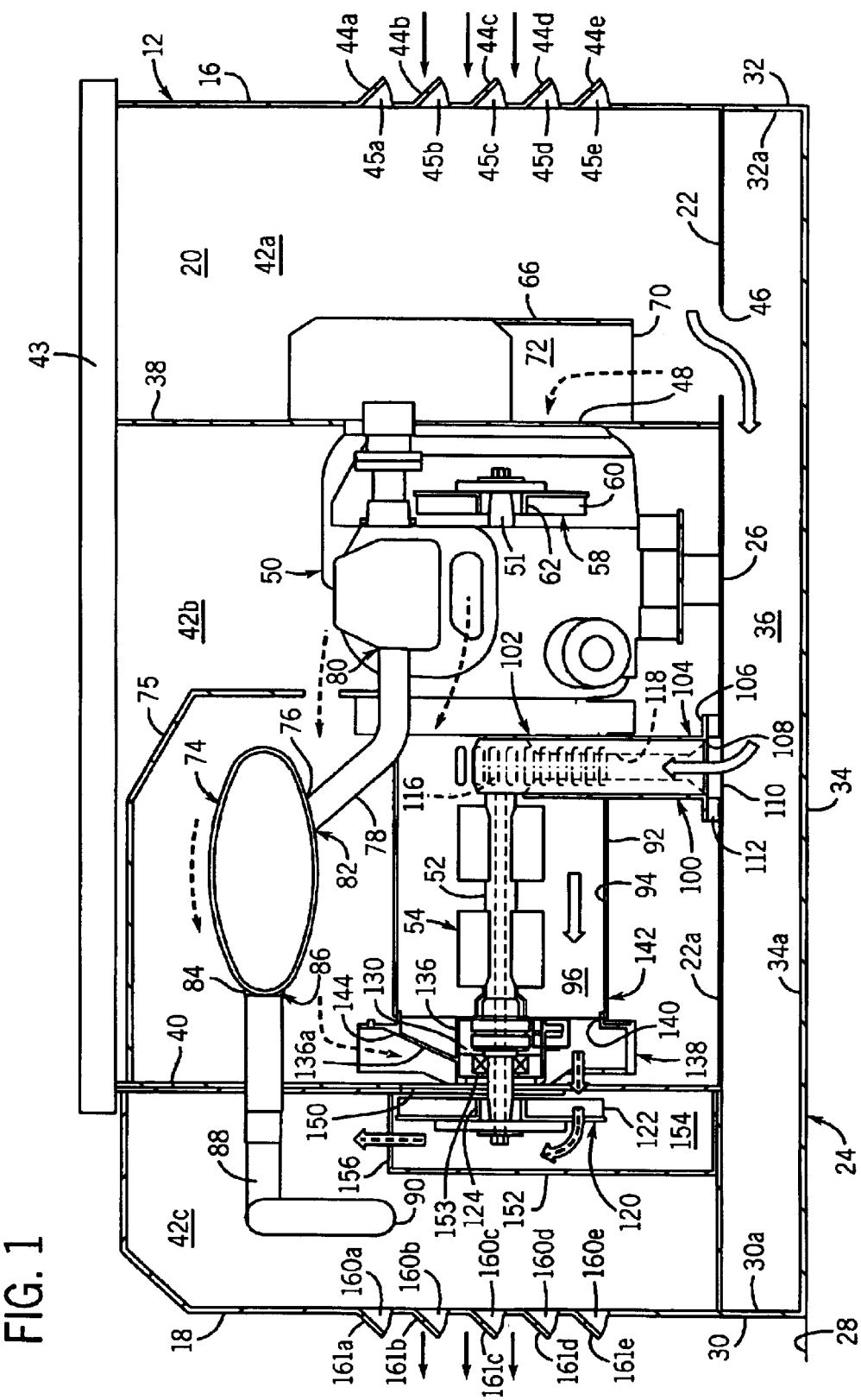
FIG. 1 is a schematic view of a stand-by electrical generator incorporating the air flow arrangement of the present invention.

Referring to FIG. 1, a stand-by electrical generator incorporating the air flow arrangement of the present invention is generally designated by the reference numeral 10. Generator 10 includes an enclosure 12 having a forward wall 16 and a rear wall 18 which define a chamber 20 therebetween. Forward wall 16 and rear wall 18 of enclosure 12 are interconnected by sidewalls (not shown) and a lower, bottom wall 22.

Base 24 is mounted to the underside 26 of bottom wall 22 of enclosure 12 for supporting generator 10 above a supporting surface 28 such as the ground, a concrete slab or a mounting pad. Base 24 is generally rectangular in shape and defined by vertical sidewalls 30 and 32 interconnected by bottom wall 34. Inner surfaces 30a and 32a of sidewalls 30 and 32, respectively, and inner surface 34a of bottom wall 34 define cavity 36 in base 24.

Forward and rearward partitions 38 and 40, respectively, extend upwardly from the upper surface 22a of bottom wall 22 of enclosure 12. Forward and rearward partitions 38 and 40, respectively, divide chamber 20 within enclosure 12 into three compartments, namely, a forward compartment 42a defined between forward partition 38 and forward wall 16; an engine compartment 42b defined between rearward partition 40 and forward partition 38; and an exhaust compartment 42c defined between rear wall 18 of enclosure 12 and rearward partition 40. Cover 43 is positioned on forward wall 16, forward partition 38, and rearward partition 40 to isolate engine compartment 42b and forward compartment 42a from the ambient air outside enclosure 12. However, forward compartment 42a does communicate with the ambient air outside of enclosure 12 through openings 45a–45e in louvers 44a–e which are formed in forward wall 16 of enclosure 12. Forward compartment 42a also communicates with cavity 36 within base 24 through opening 46 formed in bottom wall 22 of enclosure 12 and with engine compartment 42b in enclosure 12 through an opening 48 in forward partition 38, as hereinafter described.

Generator 10 includes an engine generally designed by the reference numeral 50 supported within engine compartment 42b within enclosure 12. As is conventional, engine 50 receives fuel such as natural gas or liquid propane vapor through an intake. The fuel is compressed and ignited within the cylinders of engine 50 so as to generate reciprocating motion of the pistons of engine 50. This reciprocating motion of the pistons of engine 50 is converted to rotary motion by crankshaft 51. Crankshaft 51 is coupled to an alternator shaft 52, which, in turn, couples alternator 54 to engine 50. As crankshaft 51 is rotated by operation of engine 50, alternator shaft 52 is rotated thereby driving alternator 54 which, in turn, converts the mechanical energy generated by engine 50 to electricity for transmission and distribution.

In addition to alternator 54, fly wheel 62 is operatively connected to the crankshaft 51 of engine 50. Fly wheel 62 includes a plurality of blades 60 projecting radially therefrom. Fly wheel 62 is connected to crankshaft 51 so as to define a fan 58 such that rotation of crankshaft 51 is translated to fan 58.

Acoustic deflector 66 is mounted to forward partition 38 within forward compartment 42a of enclosure 12. Acoustic deflector 66 overlaps opening 48 in forward partition 38 through which engine compartment 42b communicates with interior 72 of acoustic deflector 66. In addition, acoustic deflector 66 includes an opening 70 therein which allows forward compartment 42a of enclosure 12 to communicate with interior 72 of acoustic deflector 66. As described, a flow path is defined between forward compartment 42a and engine compartment 42b through acoustic deflector 66.

The exhaust valve of engine 50 is interconnected to an input 76 of a muffler 74 through an exhaust pipe 78. Exhaust pipe 78 has an input end 80 operatively connected to the exhaust valve of engine 50 and an output 82 operatively connected to input 76 of muffler 74. Muffler 74 is positioned within muffler box 75 in engine compartment 42b and includes an output 84 operatively connected to input 86 of an exhaust discharge tube 88. Exhaust discharge tube 88 includes an outlet 90 which communicates with exhaust compartment 42c in enclosure 12.

Generator 10 of the present invention further includes alternator housing 92 which includes an inner surface 94 that defines passageway 96 therethrough. Alternator housing 92 extends along the longitudinal axis of alternator shaft 52 towards rearward partition 40 and houses alternator 54 therein. A generally rectangular air flow conduit generally designated by the reference numeral 100 has a first end 102 disposed within passageway 96 through alternator housing 92 and a second opposite end 104. Flange 106 extends radially from second end 104 of air flow conduit 100 and is interconnected to upper surface 22a of bottom wall 26 of enclosure 12 by any suitable means such that opening 108 in second end 104 of air flow conduit 100 overlaps opening 110 in bottom wall 26 of enclosure 12. Seal 112 is positioned between upper surface 22a of bottom wall 26 of enclosure 12 and flange 106 of air flow conduit 100 to prevent the flow of air therepast. Openings 116 in first end 102 of air flow conduit 100 allows passageway 96 thruogh alternator housing 92 to communicate with cavity 36 within base 24 through interior 118 of air flow conduit 100.

Generator 10 further includes fan 120 disposed in exhaust compartment 42c of enclosure 12. Fan 120 includes a plurality of fan blades 122 extending radially from a central fly wheel 124. Fly wheel 124 is operatively connected to alternator shaft 52 such that rotation of alternator shaft 52 is translated to fly wheel 124, and hence, to alternator shaft 52. Alternator shaft 52 is rotatably supported within central passageway 130 extending through generally cylindrical, hollow support 136 of end cap 138. Support 136 of end cap 138 extends along an axis which is co-incident with the longitudinal axis of alternator shaft 52. End cap 138 includes a mounting flange 140 which is received within and interconnected to first end 142 of alternator housing 92. Guide wall 144 extends between mounting flange 140 and support 136 of end cap 138 so as to partially define a flow path with rearward partition 40 between engine compartment 42b and opening 150 in rearward partition 40. Second guide wall 145 and outer surface 136a of support 136 define a flow path between passageway 96 through alternator housing 92 and opening 150 in rearward partition 40. Support 136 of end cap 138 supports alternator shaft 52 such that fan 120 is axially aligned with opening 150 in rearward partition 40 in enclosure 12. It is contemplated to provide bearings 153 about alternator shaft 52 in support 136 of end cap 138 to facilitate rotation of alternator shaft 52.

Fan shroud 152 is positioned about the fan blades 122 and is mounted to rearward partition 40 of enclosure 12. Fan shroud 152 has an interior 154 which communicates with engine compartment 42b in enclosure 12 and with passageway 96 through alternator housing 92 through opening 150 in rearward partition 40. Fan shroud 152 includes an opening 156 therein which allows engine compartment 42b of enclosure 12 to communicate with exhaust compartment 42c of enclosure 12 through interior 154 thereof.

In operation, engine 50 is actuated such that the crankshaft 51 thereof rotates alternator shaft 52. The rotational movement of alternator shaft 52 is translated to fans 120 and 58, respectively, as heretofore described. As fan 58 rotates, ambient air is drawn through openings 45a–e defined by corresponding louvers 44a–e into forward compartment 42a of enclosure 12.

Fan 58, in combination with fan 120, draws a first portion of the air within forward compartment 42a of enclosure 12 through passageway 72 in acoustic deflector 66 and into engine compartment 42b within enclosure 12. The first portion of the air passes over the fins on engine 50 so as to cool the components thereof. The first portion of the air is forced over the engine fins and muffler 74 by fan 58 and is drawn towards the rear of enclosure 12 by fan 120.

In addition, a second portion of the air within forward compartment 42a of enclosure 12 is drawn into cavity 36 within base 24 through opening 46 in bottom wall 22 of enclosure 12 by fan 120. Fan 120 continues to draw the second portion of air from cavity 36 in base 24 into the interior 118 of air flow conduit 100 through opening 110 in bottom wall 22 of enclosure 12; through openings 116 in second end 102 of air flow conduit 100; and into passageway 96 through alternator housing 92. The second portion of air drawn through passageway 96 in alternator housing 92 passes over alternator 54 so as to cool alternator 54 during operation of generator 10.

The second portion of air within alternator housing 92 and the first portion of air within engine compartment 42b are drawn through opening 150 in rearward partition 40 and are combined by action of fan 120. Fan 120 directs the air through interior 154 of shroud 152 into exhaust compartment 42c of enclosure 12. The combined air is mixed with the exhaust of engine 50 which flows through the exhaust tube 78; muffler 74; and out of output 90 of exhaust discharge tube 88 into exhaust compartment 42c of enclosure 12 so as to cool the exhaust of engine 50. The mixture of the exhaust from engine 50 and the combined air is urged from enclosure 12 through openings 160a–b defined by louvers 161a–e in rear wall 18 of enclosure 12 into the atmosphere surrounding generator 10 by the pressure of the exhaust discharged from output 90 of exhaust discharge tube 88 and by the air flow of the combined air generated by fan 120.

As described, the ambient air enters enclosure 12 through the forward end thereof and exits enclosure 12 through the rearward end thereof. It can be appreciated that the first portion of air drawn into enclosure 12 is utilized to cool engine 50, while the second portion of the air is utilized to cool alternator 54. As a result, the air flow arrangement heretofore described provides a greater cooling efficiency for generator 10. In addition, since ambient air is continually drawn into the enclosure 12 and the engine exhaust, coupled with the combined air after heat exchange, is continually purged from enclosure 12 during operation of generator 10, the components are maintained at a cooler temperature than under prior art flow arrangements. Further, given the continual flow of ambient air through enclosure 12, it is possible to provide sound insulation in forward and rear walls 16 and 18, respectively, the sidewalls interconnecting the forward and rear walls 16 and 18, respectively, and cover 43 without increasing the temperature within enclosure 12 to an unacceptable level, thereby providing for quieter operation of the generator.

Various modes of carrying out the invention are contemplated as being within the scope of the following claims particularly pointing out and distinctly claiming the subject matter which is regarded as the invention.

We claim:

1. A generator structure, comprising:
   an enclosure having first and second opposite ends, the enclosure defining a forward compartment, an engine compartment for receiving an engine and an alternator therein, and an exhaust compartment for receiving an exhaust discharge tube operatively connected to the engine;
   a first air flow generator positioned within the enclosure for drawing ambient air defined by first and second portions into the forward compartment through the first end of the enclosure, the first air flow generator directing the first portion of ambient air across the engine in the engine compartment; and
   a second air flow generator positioned within the enclosure, the second air flow generator:
      drawing the second portion of ambient air over the alternator;
      combining the first portion of air directed over the engine and the second portion of air drawn over the alternator
      urging the combination of the first and second portions of ambient air into the exhaust compartment; and
      urging exhaust exiting the exhaust discharge from the engine and the combination of the first and second portions of ambient air from the exhaust compartment through the second end of the enclosure.

2. The generator structure of claim 1 further comprising a muffler interconnecting the engine and the exhaust discharge tube.

3. The generator structure of claim 1 further comprising an alternator housing within the engine compartment of the enclosure, the alternator housing having an interior for supporting the alternator therein.

4. The generator structure of claim 1 further comprising a base for supporting the enclosure above a supporting surface, the base being generally hollow and having an input communicating with the formed compartment and an output communicating with the interior of the alternator housing.

5. The generator structure of claim 1 wherein the first air flow generator is a fan.

6. The generator structure of claim 1 wherein the second air flow generator is a fan.

7. An air flow structure for controlling the flow of air over a generator set including an alternator, an engine driving the alternator, and an exhaust discharge tube having an outlet for discharging engine exhaust generated during the operation thereof, the air flow structure comprising:

an enclosure for a generator having first and second opposite ends and defining a forward compartment, an engine compartment and an exhaust compartment for receiving the outlet of the exhaust discharge tube, a first air flow generator positioned within the enclosure for drawing ambient air defined by first and second portions into the forward compartment through the first end of the enclosure, the first flow generator directing a first portion of air across the engine; and a second air flow generator positioned within the enclosure, the second air flow generator:

drawing the second portion of ambient air over the alternator;

combining the first portion of ambient air directed over the engine and the second portion of ambient air drawn over the alternator and urging the combined air into the exhaust compartment; and urging the combined air and the engine exhaust from the exhaust compartment through the second end of the enclosure.

8. The generator structure of claim 7 further comprising a muffler positioned within the engine compartment of the enclosure adjacent the second end thereof.

9. The generator structure of claim 7 further comprising an alternator housing within the engine compartment of the enclosure, the alternator housing having an interior for supporting the alternator therein.

10. The generator structure of claim 9 further comprising a base for supporting the enclosure above a support surface, the base being generally hollow and having an input communicating with the forward compartment and an output communicating with the interior of the alternator housing.

11. The generator structure of claim 7 wherein the first air flow generator is a fan.

12. The generator structure of claim 7 wherein the second air flow generator is a fan.

* * * * *